United States Patent
Eriksson et al.

(10) Patent No.: US 9,967,303 B2
(45) Date of Patent: May 8, 2018

(54) THROTTLING A MEDIA STREAM FOR TRANSMISSION VIA A RADIO ACCESS NETWORK

(71) Applicant: Telefonaktiebolaget L M Ericsson (publ), Stockholm (SE)

(72) Inventors: Ann-Christine Eriksson, Grillby (SE); Thorsten Lohmar, Aachen (DE); Mathias Sintorn, Sollentuna (SE); Robert Skog, Hasselby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 361 days.

(21) Appl. No.: 13/812,558

(22) PCT Filed: Oct. 4, 2012

(86) PCT No.: PCT/SE2012/051060
§ 371 (c)(1),
(2) Date: Jan. 28, 2013

(87) PCT Pub. No.: WO2014/054988
PCT Pub. Date: Apr. 10, 2014

(65) Prior Publication Data
US 2014/0101292 A1    Apr. 10, 2014

(51) Int. Cl.
*G06F 15/16* (2006.01)
*H04L 29/06* (2006.01)
*H04L 12/841* (2013.01)

(52) U.S. Cl.
CPC .......... *H04L 65/602* (2013.01); *H04L 47/283* (2013.01); *H04L 65/4084* (2013.01);
(Continued)

(58) Field of Classification Search
USPC .................................................. 709/219, 231
See application file for complete search history.

(56) References Cited

U.S. PATENT DOCUMENTS

| 7,324,444 B1 | 1/2008 | Liang et al. |
| 8,234,350 B1 * | 7/2012 | Gu ................... H04N 21/23430 709/203 |

(Continued)

*Primary Examiner* — Hua Fan
*Assistant Examiner* — Hermon Asres
(74) *Attorney, Agent, or Firm* — Rothwell, Figg, Ernst & Manbeck, p.c.

(57) ABSTRACT

A method of throttling a media stream, comprising a sequence of media segments, for transmission to a client via a radio access network is provided. The method comprises acquiring a media segment, determining a duration of the media segment, transmitting a first part (501'-504') of the media segment to the client, and transmitting a remaining part (501"-504") of the media segment to the client. At least one of the parts (501'-504', 501"-504") is transmitted during a time interval ($\Delta t_1$, $\Delta t_2$) which is shorter than a corresponding duration of that part, and transmitting the remaining part is delayed ($\Delta t_0$), such that a time interval ($\Delta t_{tx}$) between starting transmitting the first part and transmission of the remaining part being completed is shorter than the duration ($\Delta t_p$) of the media segment. Further, a corresponding network node for throttling a media stream is provided. Embodiments of the invention are advantageous in that bursty traffic is generated, resulting in a more efficient usage of air interface resources and reduced power consumption.

38 Claims, 4 Drawing Sheets

(52) U.S. Cl.
CPC .......... *H04L 65/605* (2013.01); *H04L 65/608* (2013.01); *H04L 65/80* (2013.01)

(56) References Cited

U.S. PATENT DOCUMENTS

| | | | |
|---|---|---|---|
| 2007/0124494 A1 | 5/2007 | Harris | |
| 2009/0225671 A1* | 9/2009 | Arbel | H04L 43/00 370/252 |
| 2010/0195602 A1* | 8/2010 | Kovvali | H04L 47/25 370/329 |
| 2011/0082924 A1* | 4/2011 | Gopalakrishnan | H04L 65/4084 709/223 |
| 2011/0191414 A1* | 8/2011 | Ma | H04L 65/608 709/203 |
| 2011/0314130 A1* | 12/2011 | Strasman | H04L 29/06 709/219 |

* cited by examiner

THROTTLING A MEDIA STREAM FOR TRANSMISSION VIA A RADIO ACCESS NETWORK

CROSS-REFERENCE TO RELATED APPLICATION

This application is a 35 U.S.C. § 371 National Phase Entry Application from PCT/SE2012/051060, filed Oct. 4, 2012, and designating the United States, which application is incorporated by reference herein in its entirety.

TECHNICAL FIELD

The invention relates to a method of throttling a media stream for transmission to a client via a radio access network, and a corresponding network node.

BACKGROUND

There is an increased interest in Hypertext Transfer Protocol (HTTP) streaming techniques, in particular for distribution of video to clients via mobile networks, i.e., Radio Access Networks (RANs), allowing for bitrate adaptation and streaming of live content. This is achieved by providing media content to clients in the form of media segments, i.e., files, each media segment containing media content of certain duration, e.g., five or ten seconds.

Client devices are provided with a manifest file which lists available representations of media content and where to fetch them by means of Uniform Resource Indicators (URIs). By providing different representations of the same content, e.g., having different qualities and corresponding media bitrates, clients may dynamically adapt the bitrate by selecting an appropriate representation on a segment-by-segment basis. Typically, the manifest file is fetched at least once at the beginning of the streaming session and may be updated during an ongoing session.

The media segments are provided by a media server and continuously fetched by clients, using HTTP, where they can be merged into a continuous media stream. If the available link bitrate, i.e., the bitrate which is supported by the radio link through which the client communicates with the RAN, changes, the client may select a different representation having a lower, or larger, media bitrate. In this way, use experience may be maximized while network conditions are taken into consideration. Adaptive HTTP Streaming (AHS) techniques typically require the client to measure the available link bitrate and to select an appropriate representation from the manifest file, i.e., a representation which can be delivered safely using the available link bitrate, for download.

The $3^{rd}$ Generation Partnership Project (3GPP) has standardized AHS, which has been extended by the Motion Picture Experts Group (MPEG) to Dynamic Adaptive Streaming over HTTP (DASH). DASH is also being used as basis for HTTP streaming in Release 10 of 3GPP, called 3GP/MPEG DASH. Other solutions for HTTP streaming are, e.g., HTTP Live Streaming (HLS) by Apple, Smooth Streaming (ISM) by Microsoft, and Adobe Dynamic Streaming.

Different file formats are used for the media segments, such as MPEG2-TS or ISO BMFF, e.g., MP4. Known formats for manifest files are, e.g., Media Presentation Description (MPD) for DASH, 'm3u8' for HLS, and 'ismc' for ISM.

From a network perspective, in particular RANs, it is desirable to control the bitrate of media streams so as to limit the resources which need to be allocated to streaming clients, and to use the available air interface resources more efficiently. For instance, the transmission of media segments to a client may be throttled, or shaped, by pacing the transmission, thereby forcing the client to select a lower quality representation. However, since only a limited number of discrete media quality levels are available, a media stream which is transmitted to a mobile client may not fully utilize the available link bitrate. Further, pacing the transmission prevents the RAN from allocating links which support even higher bitrates and which would use the air interface more efficiently.

SUMMARY

It is an object of the invention to provide an improved alternative to the above techniques and prior art.

More specifically, it is an object of the invention to provide an improved throttling of a media stream which is delivered to a client via a RAN.

These and other objects of the invention are achieved by means of different aspects of the invention, as defined by the independent claims. Embodiments of the invention are characterized by the dependent claims.

For the purpose of describing the invention, it is to be understood that a media stream delivers media content, such as audio or video, from a source, by which the media content is provided, to a client, where the media content is rendered. For instance, in the case of video, media content may be provided by a media server and delivered to a client, where it is rendered on a display which the client is provided with. The client may, e.g., be a User Equipment (UE), a mobile phone, a smart phone, a tablet computer, a media player, or any other computing device capable of wireless communications via a RAN.

The wireless communications may be effected by any suitable radio access technology and/or standard, such as Global System for Mobile Communications (GSM), Universal Mobile Telecommunications System (UMTS), Long Term Evolution (LTE), Wireless Local Area Network (WLAN)/WiFi, Bluetooth, or the like.

According to a first aspect of the invention, a method of throttling a media stream for transmission to a client via a RAN is provided. The media stream comprises a sequence of media segments. The method comprises acquiring a media segment of the sequence of media segments, determining a duration of the media segment, transmitting a first part of the media segment to the client, and transmitting a remaining part of the media segment to the client. At least one of the parts of the media segment is transmitted during a time interval which is shorter than a corresponding duration of that part. Further, the transmitting the remaining part is delayed, such that a time interval between starting transmitting the first part and transmitting the remaining part being completed is shorter than the duration of the media segment. An embodiment of the method may, e.g., be performed by a media server, a proxy, an edge server, a Radio Network Controller (RNC), a NodeB, an eNodeB, or any other network node suitable for delivering media streams.

According to a second aspect of the invention, a network node for throttling a media stream for transmission to a client via a RAN is provided. The media stream comprises a sequence of media segments. The network node comprises means for acquiring a media segment of the sequence of media segments, means for determining a duration of the media segment, and means for transmitting the media segment. The means for transmitting the media segment is arranged for transmitting a first part of the media segment to the client, and transmitting a remaining part of the media segment to the client. The means for transmitting the media segment is further arranged for transmitting at least one of the parts of the media segment during a time interval which is shorter than a corresponding duration of that part, and delaying the transmission of the remaining part, such that a time interval between starting transmitting the first part and transmitting the remaining part being completed is shorter than the duration of the media segment. The network node may, e.g., be a media server, a proxy, an edge server, an RNC, a NodeB, an eNodeB, or any other network node suitable for delivering media streams.

The invention makes use of an understanding that radio friendly throttling of a media stream, comprising a sequence of media segments, may be achieved by transmitting media segments in at least two parts, wherein the transmission of the final part, also referred to as remaining part, is delayed. At least one of the parts is transmitted during a time interval which is shorter than a corresponding duration of that part. In other words, at least one of the parts is transmitted with an increased bitrate, i.e., a bitrate which is larger than the media bitrate of the media segment. The media bitrate is the bitrate of the actual media content, i.e., the amount of data contained in a media segment divided by the duration of the media segment. It will be appreciated that the media bitrate is the bitrate which is required for transmitting the media segment in one part during a time interval substantially equal to the duration of the media segment. The duration of the media segment is the duration of media content comprised in the media segment.

The delay and the bitrates used for transmitting the distinct parts of the media segment are selected such that a time interval during which the complete media segment is delivered to the client, i.e., between starting transmitting the first part and the transmission of the remaining part being completed, is shorter than the duration of the media segment. Preferably, the time interval during which the complete media segment is delivered to the client is just shorter than the duration of the media segment. To this end, the time interval during which the complete media segment is delivered to the client is adjusted such that the client refrains from switching to a representation a higher, or lower, media bitrate.

Throttling of a media stream in accordance with an embodiment of the invention has two effects. Firstly, traffic which is associated with the transmission of the throttled media stream by the RAN to the client is bursty, since each media segment is transmitted in at least two parts, at least one of which is transmitted with an increased bitrate. This is advantageous since bursty traffic is radio friendly in that available resources of the air interface are used more efficiently. Preferably, the bitrates used for transmitting the parts of the media segments are adjusted such that an available link bitrate, i.e., a bitrate supported by a radio link by which the client communicates with an access node of the RAN, is fully utilized. Optionally, the bitrate used for transmitting the parts of the media segment may be chosen such that the RAN uses a radio link having a higher bitrate than what would be required if the media segment would be delivered in one part, i.e., if it would be transmitted with the media bitrate. In this respect, it will be appreciated that a certain safety margin is required, i.e., a link bitrate should be larger than the media bitrate, in order to allow for link bitrate variations which are inherent to RANs. As a further advantage, bursty traffic reduces the power consumption of the client, resulting in a prolonged battery lifetime.

Secondly, by delaying the transmission of the remaining, final, part of each media segment, a client measuring the available bitrate during download of a media segment may be prevented from switching to a representation having a larger media bitrate, and, correspondingly, requiring an increased link bitrate. In this respect, it is assumed that the client determines the downlink bitrate by measuring the elapsed time between receiving the first data of a media segment and receiving the final data of a media segment. Consequently, by transmitting the first part of the media segment, preferably with an increased bitrate, then introducing a silent, or idle, time during which delivery of the media segment is stalled, and subsequently transmitting the remaining part of the media segment, such that the complete media segment is delivered to the client within a time interval which is equal, or just shorter, to the duration of the media segment, the downlink bitrate as perceived by the client is substantially the same as if the media segment is delivered in accordance with the prior art, i.e., in one part, using the media bitrate, in substantially the same time interval. Advantageously, the RAN may allocate available air interface resources during silent times to other services of the same client and/or other clients accessing the same RAN.

Thus, an embodiment of the invention is advantageous in that media streams delivered to clients via a RAN may be throttled such that the associated traffic becomes bursty, while at the same time preventing the client receiving the media stream from requesting a media representation which requires an increased bitrate.

Further, by adjusting the bitrate used for transmitting the distinct parts of the media segments, the delay between consecutive parts, as well as the time interval during which the complete media segment is delivered, a client may also be forced to switch to a media representation which requires a lower bitrate. This is advantageous in that the media stream is throttled in a radio friendly way.

According to an embodiment of the invention, the method further comprises transmitting at least one intermediate part of the media segment to the client. A media segment may be delivered to the client in more than two parts, and delays may be introduced between each pair of subsequent parts. For instance, a media segment may be transmitted in three parts, a first part, a second part, and a remaining part, with delays in-between the first and the second, and the second and the remaining part, respectively. It will be appreciated that the invention is not limited to throttling of a media stream by transmitting media segments in two or three parts, but one may envisage embodiments of the invention transmitting media segments in more than three parts.

According to an embodiment of the invention, the first part and the remaining part make up the complete media segment. In other words, a media segment is transmitted to the client in two parts, a first part and a second, remaining, part. Delivering media segments in two parts is advantageous in that bursty traffic may be generated, and the bitrate selection of the client may be controlled, without altering the transmission of the media stream more than necessary. In this respect, it is noted that transmitting media segments in too many parts may result in a less radio friendly delivery over the RAN, since the switching between different RAN radio states, e.g., between a state which is associated with a high bitrate for transmitting a first part of the media segment, and a state which is associated with a low bitrate for transmitting a remaining part of the media segment, is resource consuming and effects battery life time.

According to an embodiment of the invention, the media segment is acquired by receiving the media segment from a media server. In this case, the embodiment relates to a proxy, an intermediate network node for routing traffic, an RNC, a NodeB, or an eNodeB, which is arranged for shaping a bitstream delivered from a media server to a client. Media segments may be received from the media server via a communications network such as a core network, the internet, or a transport network of the RAN. Alternatively, media segments may be retrieved from a storage, e.g., a local storage, or a buffer. The latter case relates to a media server or any network node providing media content by way of streaming.

According to an embodiment of the invention, the media segments are transmitted to the client using AHS. Such techniques rely on transmitting media segments on request by the client, using HTTP. The client measures the available link bitrate, i.e., the bitrate which with a media segment is received during download, and selects a suitable representation having a media bitrate which is supported by the available link bitrate.

According to an embodiment of the invention, at least one of the parts of the media segment is transmitted with a first bitrate such that a link bitrate required by the RAN for supporting the first bitrate corresponds to a high-bitrate channel. In other words, the corresponding part is transmitted with a bitrate which is selected such that the RAN is forced to allocate a radio link which supports a higher bitrate as compared to transmitting the segment in one part. This is advantageous, since the corresponding part is transmitted in shorter time, owing to the increased bitrate, resulting in bursty traffic and improved air interface efficiency. For instance, if the RAN is a UMTS network, the first bitrate may be selected such that a High-Speed Downlink Packet Access (HSDPA) channel is allocated.

According to an embodiment of the invention, the remaining part is transmitted with a second bitrate such that a link bitrate required by the RAN for supporting the second bitrate corresponds to a low-bitrate channel. In other words, the remaining part is transmitted with a bitrate which is selected such that the RAN may allocate a less resource consuming radio channel, supporting a relatively low link bitrate. This is advantageous in that the constraints on resource allocation by the RAN for transmitting the remaining part of a media segment are lowered. Preferably, the bitrate is selected such that the remaining part can be transmitted to the client over a common channel, such as a Forward Access Channel (FACH) in a UMTS network. In the latter case, no dedicated channel needs to be allocated for transmitting the remaining part to the client.

According to an embodiment of the invention, the remaining part is smaller than the first part of the media segment. Preferably, the remaining part is substantially smaller than the first part. This is particularly advantageous in that the first part, which is considerably larger than the remaining part, may be transmitted to the client with a relatively high bitrate, thereby improving the efficient utilization of the air interface, subsequent to which the relatively small remaining part is transmitted. Preferably, the size of the remaining part is sufficiently small such that it may be transmitted to the client over a less resource consuming radio channel, e.g., a common channel such as FACH. The distribution of the media segment among the two parts depends on a number of parameters, such as available bandwidth, latency, and so forth. As an example, the first part may amount to at least 90% of the media segment. As a further example, the first part may amount to at least 98% of the media segment.

According to an embodiment of the invention, the duration of the media segment is determined using Deep Packet Inspection (DPI). DPI relates to techniques for analyzing the content of data packets which are transmitted over a communications network, in comparison with inspecting only the headers of data packets for the purpose of routing. By inspecting the content of the media segments, the duration of a media segment may be determined. This is advantageous in that an embodiment of the invention may determine the duration of media segments without inspecting the manifest file, which may be encrypted. For instance, in the case of DASH, the media duration may be determined by inspecting the 'sidx box' of the MP4 file, or by counting the frames contained in the 'trun box'.

According to an embodiment of the invention, the duration of the media segment is determined using a transparent Transmission Control Protocol, TCP, proxy. In this case, the proxy terminates the HTTP requests received from the clients over a first connection and fetches the media segments using a second connection which is separate from the first connection and which is established between the proxy and the server. Upon receiving the media segments over the second connection, the proxy determines the duration of the media segments and forwards the media segments over the first connection to the client. The duration of media segments may be determined by inspecting packet headers or manifest files, or by means of DPI.

According to an embodiment of the invention, the duration of the media segment is determined by determining a periodicity with which media segments are requested by the client. Adaptive HTTP streaming techniques rely on the client requesting media segments of certain duration. Consequently, the periodicity with which a client requests subsequent media segments belonging to the same media stream is a measure of the duration of a media segment. For instance, if each media segment contains five seconds of media content, a client will request media segments with a periodicity of about five seconds. This embodiment of the invention is advantageous in that the duration of media segments may be determined without relying on more complex techniques such as DPI, which may require knowledge of the file format used for the delivery of media segments.

According to an embodiment of the invention, the duration of the media segment is determined by inspecting a manifest file. The manifest file comprises information describing media presentations available to the client and is typically provided by the same media server as the corresponding media stream. This is advantageous if the manifest file is not encrypted, since it allows determination of the duration of media segments without relying on more complex techniques which may require knowledge of the file format used for the delivery of media segments.

According to an embodiment of the invention, the duration of the media segment is determined by determining a periodicity with which media segments are acquired. In particular if the media segments are received from a media server, or from a communications network, the periodicity with which media segments are received may be used as a measure of the duration of a media segment. This is advantageous since it allows determination of the duration of media segments without relying on more complex techniques such as DPI, which may require knowledge of the file format used for the delivery of media segments.

According to an embodiment of the invention, information pertaining to the duration of the media segment is acquired from the media server. This is advantageous in that it provides a simple way of determining the duration of media segments without relying on more complex techniques. Optionally, information pertaining to the duration of the media segment may be retrieved out-of-band, i.e., separate from the media stream Even though advantages of the invention have in some cases been described with reference to embodiments of the method according to the first aspect of the invention, corresponding reasoning applies to embodiments of the network node according to the second aspect of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
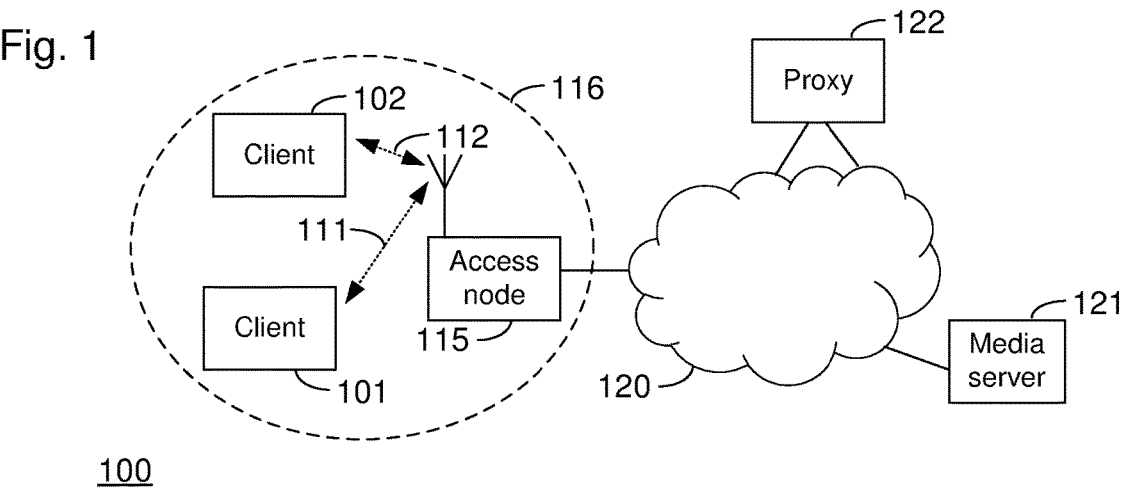
FIG. 1 illustrates a system for streaming media to a client via a RAN.

In FIG. 1, a system for delivering a media stream to mobile clients via a RAN is illustrated.

System 100 comprises two clients 101 and 102 which access a RAN 116 through an access node 115, such as a Radio Base Station (RBS), a NodeB, an eNodeB, a WLAN access point, or the like, capable of effecting wireless communications with clients 101 and 102, via radio links 111 and 112, respectively. Clients 101 and 102 may be mobile terminals, UEs, smartphones, computers, media players, or any other type of computing device capable of effecting wireless communications with access node 115, and for receiving a media stream. It will be appreciated that, even though two clients 101 and 102 are illustrated in FIG. 1, embodiments of the invention are not limited to RANs being accessed by two clients.

Access node 115 is connected, via a communications network 120, to a media server 121 and, optionally, a proxy 122. A client, e.g., client 101, may access media content provided by media server 121 by requesting a media stream from media server 121. The media stream is delivered, i.e., transmitted, from media server 121 via communications network 120 to access node 115 and further to client 101. Optionally, the media stream may be delivered via proxy 122.

Access node 115 allocates radio resources for transmitting the media stream to client 101 by means of radio link 111, which is established between client 101 and access node 115. Typically, radio links in a RAN, such as radio links 111 and 112 shown in FIG. 1, are suitable for effecting wireless communications both in uplink, i.e., from a client to a RAN access node, and in downlink, i.e., from the access node to the client. Depending on the radio technology employed by the RAN, and the standard according to which the wireless communications are effected, different types of radio channels may be set up between client and access node, each type of radio channel having a supported link bitrate as well as a resource consumption associated with it. As a general rule, the resource consumption associated with a radio channel, e.g., power consumption in the access node and the client, increases with increasing supported bitrate. Consequently, a high-bitrate channel, e.g., a HSDPA channel, consumes more power than a low-bitrate channel, e.g., a FACH. This is of particular importance in battery powered clients where battery lifetime is an issue.

In the following, the principle of streaming media to mobile clients, i.e., clients accessing media content via a RAN, using adaptive streaming techniques, in particular AHS, is described with reference to FIG. 2.

For the purpose of describing embodiments of the invention, it is assumed that a media stream is delivered to clients by means of media segments comprising media content of certain duration, e.g., five or ten seconds. The media content may be coded in a suitable file format. The same media content, e.g., an audio sequence or a video, may be provided in different representations which are characterized by different media qualities and associated bitrates. In other words, a client may request a video in a low resolution, if only a low link bitrate is available to the client, or in a high resolution, if a higher link bitrate is available to the client. The different representations which are available to a client are described in a manifest file which provides the client with information where to fetch corresponding media segments. This information may, e.g., be provided by means of URIs.

The available link bitrate is typically dependent on network conditions, such as network load, and radio conditions. In adaptive streaming techniques, such as AHS, the client is responsible for measuring the available link bitrate and for selecting a suitable representation, i.e., a representation having a media bitrate which can be safely delivered to the client in view of the available link bitrate. Typically, a client measures the time interval during which a complete media segment is received. From the measured time interval, and the amount of data carried by a media segment, the available link bit rate may be calculated.

Figure 2:
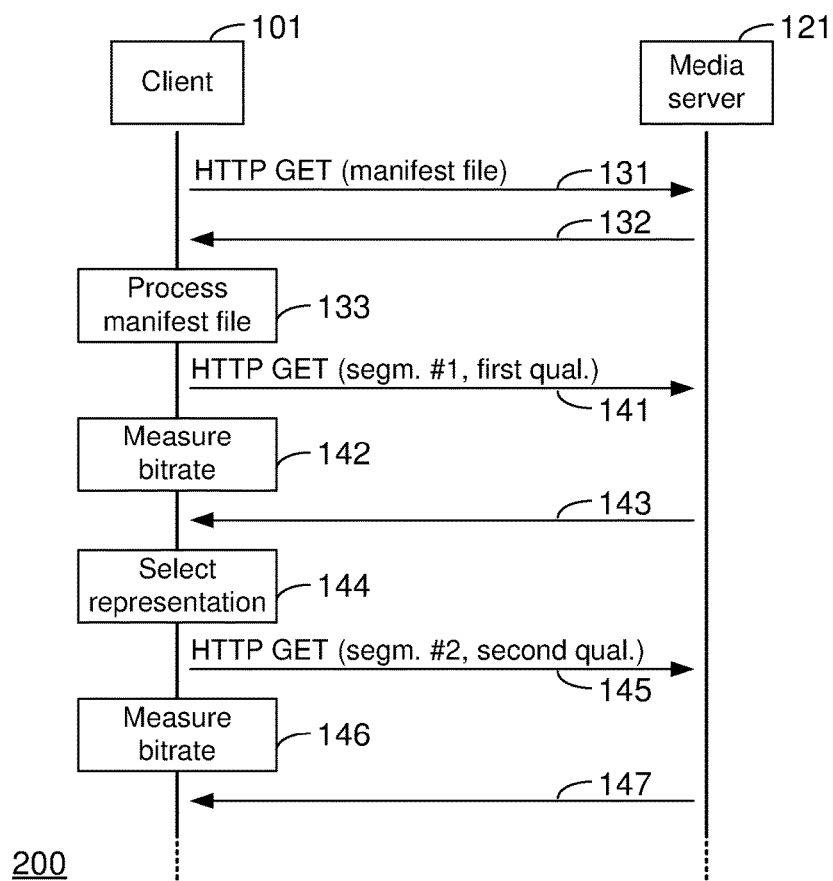
FIG. 2 illustrates fetching of media segments by a client.

Further with reference to FIG. 2, a session 200 for streaming media from media server 121 to client 101 using AHS is described. Session 200 is initiated by client 101 requesting 131a manifest file from media server 121. This is accomplished by sending an HTTP GET message 131 requesting the manifest file. In response to request 131, media server 121 transmits 132 the manifest file to client 101. Then, client 101 processes 133 the manifest file and selects a suitable representation of the media content, e.g., a video, to which the manifest file relates. For instance, client 101 may select a first, low, quality based on an estimation of an available link bitrate. Subsequently, client 101 requests 141, using HTTP GET, the first media segment of the selected representation. The information which is transmitted with HTTP GET request 141 indicates that the first media segment, being coded in a first quality, is requested. This information may, e.g., be conveyed by means of URIs, as described in the manifest file. In response to receiving HTTP GET request 141, media server 121 transmits 143 the first media segment coded in a first quality to client 101.

During the process of receiving the first media segment, transmitted 143 by media server 121 to client 101, client 101 measures the available link bitrate. This may, e.g., be accomplished by measuring the time which lapses between receiving the first data relating to transmission 143 of the first media segment, and receiving the final data relating to transmission 143 of the first media segment.

Then, the available link bitrate may be calculated by dividing the amount of data transmitted 143 to client 101 by the lapsed time. This yields an effective bitrate averaged over the time interval between receiving the first data and receiving the final data. This time interval is typically of the same size as the duration of media content comprised in the media segment, i.e., of the order of a few or up to ten seconds.

Client 101 may use the estimated available link bitrate in order to select 144 a different representation, having a second quality being different than the first quality, for requesting the second media segment or subsequent media segments. For instance, if the available link bitrate is sufficient to support a higher quality, client 101 may select 144a suitable representation by using corresponding URIs for requesting subsequent media segments. If, on the other hand, the available link bitrate is too small for safely transmitting media segments being coded with the first quality, client 101 may select 144 an even lower quality. In this respect, client 101 may use a certain safety margin when selecting a representation which may be safely transmitted to the client, in order to account for variations in the radio conditions.

After selecting 144 a representation, client 101 requests 145 the second media segment from media server 121, using HTTP GET. Media server 121 transmits 147, in response to request 145, the second media segment to the client. While receiving the second media segment, client 101 measures the available link bitrate, i.e., the effective, averaged, link bitrate during the time interval between receiving the first data of the second media segment and receiving the final data of the second media segment, as was described hereinbefore.

Session 200 may continue with client 101 requesting subsequent media segments from media server 121. Each media segment is delivered to client 101 by requesting a certain media segment of a certain representation, i.e., quality, and receiving the request media segment from media server 121. Optionally, client 101 may measure the available link bitrate and select a suitable representation. It will be appreciated that client 101 may be arranged for conducting link bit rate measurements for each requested media segment. As an alternative, client 101 may be arranged for conducting link bitrate measurements periodically, or only if certain conditions are met, e.g., if radio conditions get worse, such as a decreasing received signal strength measured by client 101.

Figure 3:
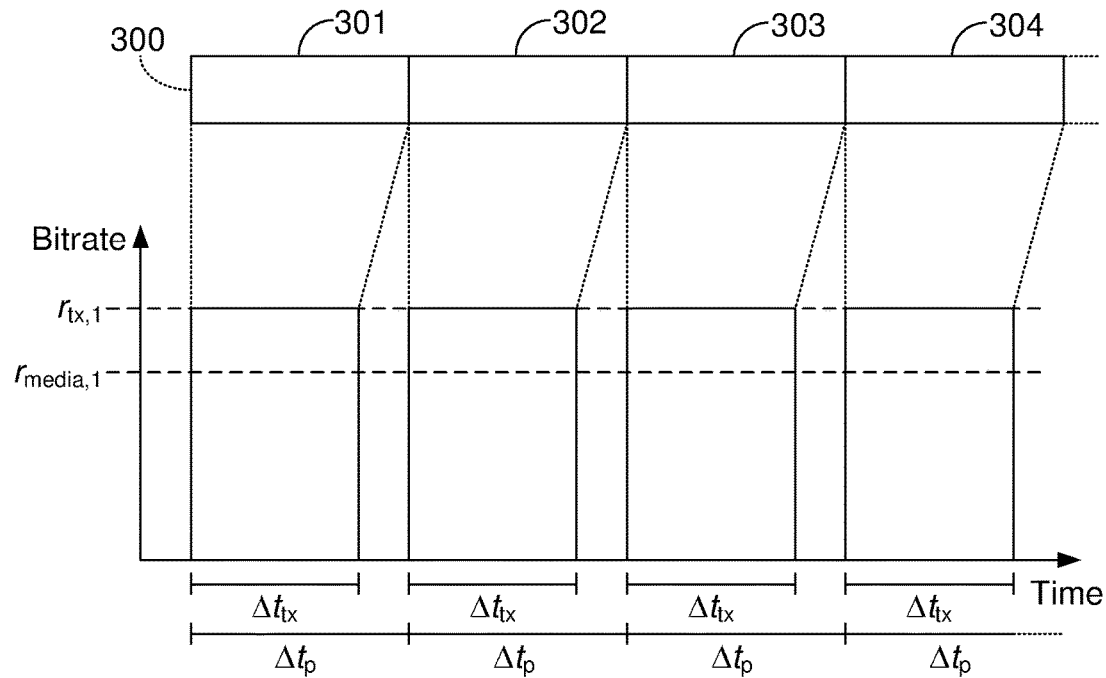
FIG. 3 illustrates delivery of media segments in a time domain.

FIG. 3 illustrates the transmission of media segments 301-304 belonging to a media stream 300. More specifically, media segments 301-304 belong to a representation of media stream 300, the representation being associated with a certain media bitrate $r_{media,1}$, and, correspondingly, quality. By way of reminder, the media bitrate is the bitrate of the actual media content, i.e., the amount of data contained in a media segment divided by the duration of the media segment. As can be seen in FIG. 3, media segments 301-304 are transmitted to the client with a certain periodicity $\Delta t_p$, which is substantially equal to the duration of a media segment, since a client needs to request a new media segment approximately with a periodicity which corresponds to the duration of the media segments. Media segments 301-304 are transmitted with a transmission bitrate $r_{tx,1}$ which is larger than the media bitrate $r_{media,1}$. Consequently, each media segment 301-304 is transmitted to the client in a time interval $\Delta t_{tx}$ which is just shorter than the periodicity $\Delta t_p$. In other words, if a suitable representation is selected by the client, the transmission of a media segment (e.g., 301) is completed just before the transmission of a subsequent media segment (e.g., 302) starts.

The scenario depicted in FIG. 3 is typical for conventional AHS. A client periodically requests media segments of a certain quality, wherein the amount of data contained in each media segment is such that it can be transmitted to the client in a time interval which is just shorter than the duration of media content in each media segment.

In the event that the bandwidth which is consumed by a streaming client is to be reduced, e.g., in order to free air interface resources for other clients, the media stream which is delivered to the client may be throttled. Known techniques for throttling, or pacing, rely on reducing the bitrate used for transmitting media segments to the client, thereby forcing the client to select a representation which is associated with a lower media bitrate, and correspondingly, quality, which is described in the following with reference to FIG. 4.

Figure 4:
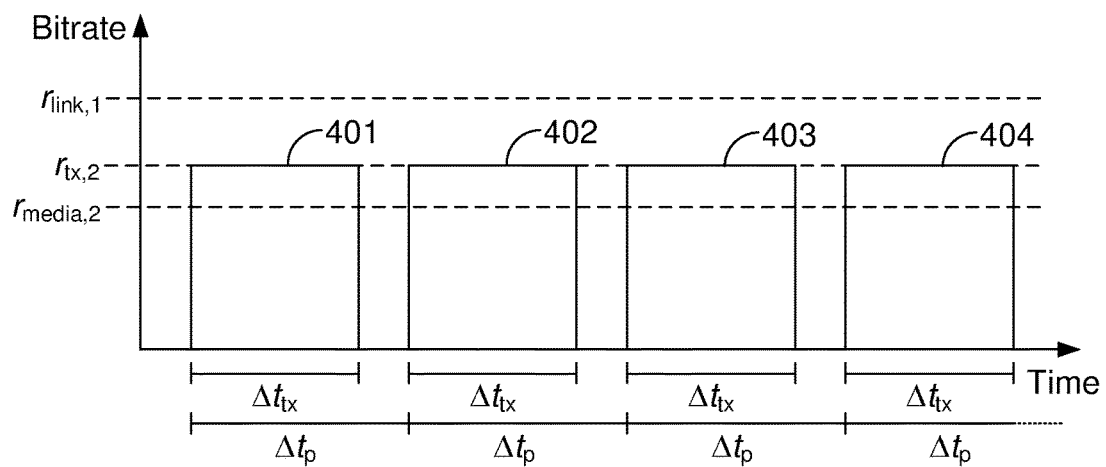
FIG. 4 illustrates conventional throttling of a media stream.

FIG. 4 illustrates the delivery of media segments 401-404 having a second quality which is lower than the first quality of FIG. 3 (for the sake of clarity, the media stream to which media segments 401-404 belong, corresponding to media stream 300 illustrated in FIG. 3, is omitted in FIG. 4). Correspondingly, the media bitrate $r_{media,2}$ of media segments 401-404 is lower than that of media segments 301-304, $r_{media,1}$.

For the purpose of illustrating throttling of a media stream in accordance with the prior art, it is assumed in FIG. 4 that media segments 401-404 are transmitted to the client with a periodicity $\Delta t_p$ which is equal to that of FIG. 3, and that each media segment 401-404 is transmitted to the client in a time interval $\Delta t_{tx}$ equal to the corresponding time interval of FIG. 3.

In the scenario depicted in FIG. 4, the bitrate $r_{tx,2}$ used for transmitting media segments 401-404 to the client is considerably lower than the link bitrate $r_{link,1}$ which is supported by the radio link between the client receiving the media stream and the access node of the RAN. This situation may, e.g., occur if the transmission bitrate $r_{tx,2}$ is sufficiently large such that the RAN cannot allocate a radio link having a lower link bitrate than what is illustrated in FIG. 4. This illustrates a problem which is inherent with throttling of media streams in accordance with the prior art, which is that the link bitrate $r_{link,1}$ may not be utilized efficiently. Note that, if media segments 401-404 would be transmitted to the client during a time interval which is shorter than what is illustrated in FIG. 4, in order to increase the transmission bitrate and thereby utilize the link bitrate $r_{link,1}$ more efficiently, the bitrate measured by the client will increase and the client may react by switching to a representation having a higher bitrate, thereby counteracting the throttling.

In the following embodiments of the invention will be described with reference to FIGS. 5 to 8.

Figure 5:
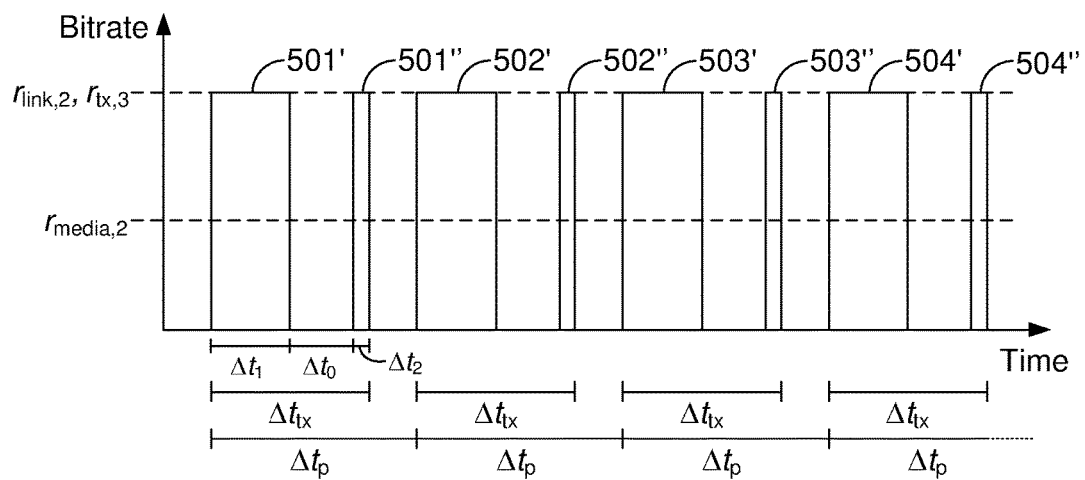
FIG. 5 illustrates throttling of a media stream in accordance with an embodiment of the invention.

FIG. 5 illustrates throttling of a media stream in accordance with an embodiment of the invention. In contrast to what has been described with reference to FIG. 4, each media segment 501-504 is not transmitted to the client in one part (for the sake of clarity, the media stream to which media segments 501-504 belong, corresponding to media stream 300 illustrated in FIG. 3, is omitted in FIG. 5). Rather, each media segment 501-504 is delivered in two parts. More specifically, the first media segment is transmitted as a first part 501' and a remaining part 501", the second media segment is delivered as a first part 502' and a remaining part 502", and correspondingly for the third (503' and 503") and fourth (504' and 504") media segments illustrated in FIG. 5.

The throttled media stream of FIG. 5 is illustrated as having a media bitrate $r_{media,2}$, which is comparable to that of FIG. 4. However, in contrast to what has been described with reference to FIG. 4, throttling of a media stream in accordance with an embodiment of the invention is achieved by transmitting each media segment in at least two parts, a first part 501'-504', and a remaining part 501"-504", and by delaying the transmission of the remaining part 501"-504" with respect to the first part 501'-504'.

This is illustrated in FIG. 5 for the first media segment. The first part 501' is transmitted during a time interval $\Delta t_1$, followed by a silent, or idle, period $\Delta t_0$ during which the transmission of the first media segment is stalled. Then, the remaining part 501" of the first media segment is transmitted during a time interval $\Delta t_2$. Thus, the complete first media segment is transmitted to the client during a time interval $\Delta t_{tx} = \Delta t_1 + \Delta t_0 + \Delta t_2$, which is illustrated as being comparable to the corresponding time interval illustrated in FIG. 4.

As is illustrated in FIG. 5, both the first 501'-504' and the remaining part 501"-504" of each media segment are transmitted with a transmission bitrate $r_{tx,3}$ which is substantially equal to the link bitrate $r_{link,2}$, thereby efficiently utilizing the allocated air interface resources. In this respect, an embodiment of the invention having knowledge about the supported link bitrates, i.e., the link bitrates which are supported by the different types of radio links which the RAN may establish between an access node of the RAN and a streaming client, may transmit a part of a media segment with a transmission bitrate which is substantially equal to one of the supported link bitrates. While this ensures that allocated air interface resources are utilized as efficiently as possible, embodiments of the invention are not limited to transmitting parts of a media segment with a bitrate which is substantially equal to a supported link bitrate.

It will be appreciated that, since the time interval $\Delta t_{tx}$ during which a complete media segment is transmitted to the client is substantially equal to that of FIG. 4, the available bitrate which is measured by the client is substantially the same, under the condition that each media segment 501-504 comprises the same amount of data as media segments 401-404. In this way, by generating bursty traffic while at the same time preventing the client from selecting a representation having an increased media bitrate, a more efficient utilization of allocated air interface resources may be achieved.

In other words, instead of, as in the prior art, reducing the transmission bitrate ($r_{tx,2}$ of FIG. 4) in order to throttle a media stream which is delivered to a client, each media segment is delivered in two parts, wherein each part is preferably transmitted with a bitrate $r_{tx,3}$ which utilizes allocated interface resources efficiently, and wherein the time interval $\Delta t_{tx}$ during which the complete media segment is delivered is maintained to be just shorter than the duration of the media segment by introducing a silent time $\Delta t_0$ in-between the two parts. Advantageously, such silent time may be allocated to other services of the same client, or other clients accessing the same RAN.

In FIG. 5, embodiments of the invention have been illustrated as being characterized by transmitting each media segment as a first part 501'-504' and a remaining part 501"-504", wherein the first parts 501'-504' are larger than the remaining parts 501"-504", i.e., they contain a larger amount of media content, and both the first 501'-504' and the remaining parts 501"-504" are transmitted with a bitrate $r_{tx,3}$ substantially equal to the bitrate $r_{link,2}$ supported by the radio link allocated by the RAN to the client receiving the media stream. However, it will be appreciated by the person skilled in that art that media segments may be transmitted to the client using more than two parts for each media segment, employing a different distribution of media content on the respective parts, and/or utilizing different transmission bitrates than what is described with reference to FIG. 5.

Figure 6:
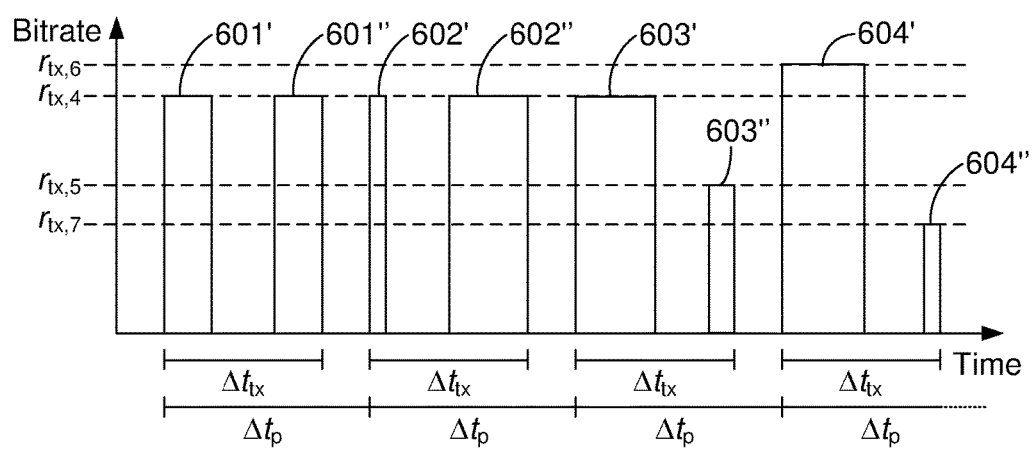
FIG. 6 illustrates throttling of a media stream in accordance with further embodiments of the invention.

For this purpose, further embodiments of the invention are illustrated in FIG. 6. For instance, a media segment 601 may be transmitted in two parts, a first part 601' and a remaining part 601", of equal, or substantially equal, size, i.e., containing substantially the same amount of media content or data. Further, a media segment 602 may be transmitted as two parts 602' and 602", wherein the remaining part 602" is larger than the first part 602'.

The first parts 601'/602' and the remaining parts 601"/602" are in FIG. 6 illustrated as being transmitted with a transmission bitrate $r_{tx,4}$, which, advantageously, but not necessarily, is substantially equal to a link bitrate supported by a radio link of the RAN. As yet a further example, media segment 603 may be transmitted as two parts 603' and 603" utilizing different bitrates $r_{tx,4}$ and $r_{tx,5}$. In this case, the remaining part 603" is transmitted with a bitrate $r_{tx,5}$ which is smaller than the bitrate $r_{tx,4}$ of the first part 603'. Finally, media segment 604 is illustrated as being transmitted as a first part 604' with an increased bitrate $r_{tx,6}$ and a remaining part 604" with a lower bitrate $r_{tx,7}$. As an example, one may consider an embodiment of the invention wherein the first part 604' is transmitted over a high-bitrate channel, such as an HSDPA channel, and the remaining part 604" is transmitted over a low-bitrate channel, such as a FACH.

It will also be appreciated by the person skilled in the art that media segments may be transmitted to a client using more than two parts. For instance, either of the parts of the embodiments described with reference to FIG. 5 or 6 may be in turn divided into parts which are transmitted with a silent time in-between.

In the following, an embodiment of the method of throttling a media stream is described with reference to FIG. 7.

The media stream comprises a sequence of media segments for transmission to a client via a RAN. Method 700 is performed sequentially, i.e., on a segment-by-segment basis, and starts with acquiring 701 a media segment of the sequence of media segments. The media segment may be retrieved from a local buffer or storage. Alternatively, the media segment may be received over a communications network, e.g., from a media server or any other server providing the media stream.

In the next step, the duration of the media segment is determined 702, i.e., the duration of media content carried by the media segment. The duration of the media segment may be determined 702 using DPI, if details about the file format used for encoding the media content are known. As an alternative, the duration of the media segment may be determined 702 using a transparent TCP proxy. Further, the duration of the media segment may be determined 702 by determining a periodicity with which media segments are requested by the client, or by determining a periodicity with which media segments are acquired 701. Even further, the duration of the media segment may be determined 702 by inspecting a manifest file, or by acquiring information pertaining to the duration of the media segment from the media server.

Subsequently, the first part of the media segment is transmitted 703 to the client, followed by a silent time period for delaying 704 transmission of the remaining part. Subsequently, the remaining part is transmitted 705 to the client.

In method 700, at least one of the parts of the media segment is transmitted 703/705 during a time interval which is shorter than a corresponding duration of that part, and wherein transmission of the remaining part 705 is delayed 704, such that a time interval between starting transmitting the first part 703 and transmission of the remaining part 705 being completed is shorter than the duration of the media segment determined in step 702.

Figure 7:
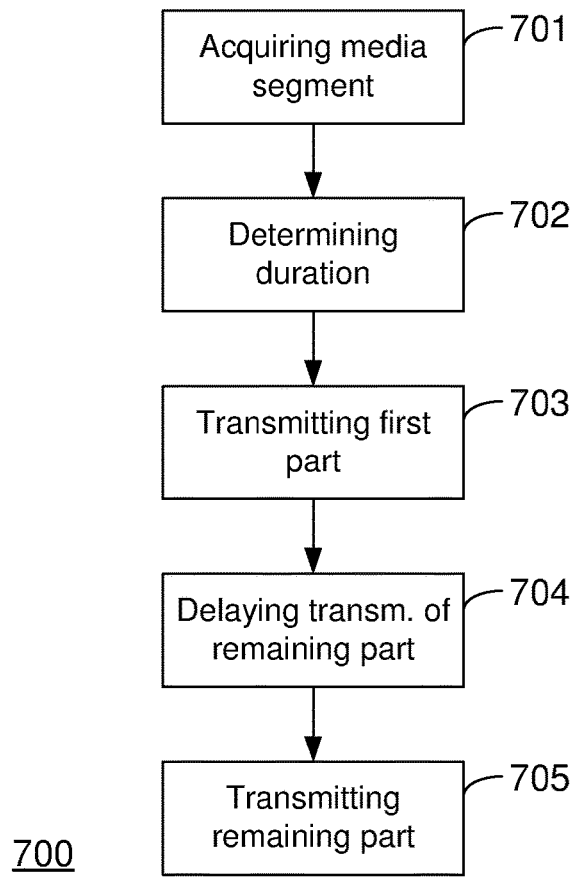
FIG. 7: illustrates a method of throttling a media stream in accordance with an embodiment of the first aspect of the invention.

Further with reference to FIG. 7, at least one of the parts of the media segment may be transmitted 703/705 with a relatively high bitrate such that a link bitrate required by the RAN for supporting that bitrate corresponds to a high-bitrate channel. Even further, the remaining part may be transmitted 705 using a relatively low bitrate such that a link bitrate required by the RAN for supporting the second bitrate corresponds to a low-bitrate channel, e.g., a FACH.

Method 700 may further comprise transmitting at least one intermediate part of the media segment to the client. Such an intermediate part is transmitted between transmitting the first part 703 and transmitting the remaining part 705. Preferably, transmission of the at least one intermediate part is delayed, similar to delaying 704 transmission of the remaining part.

Figure 8:
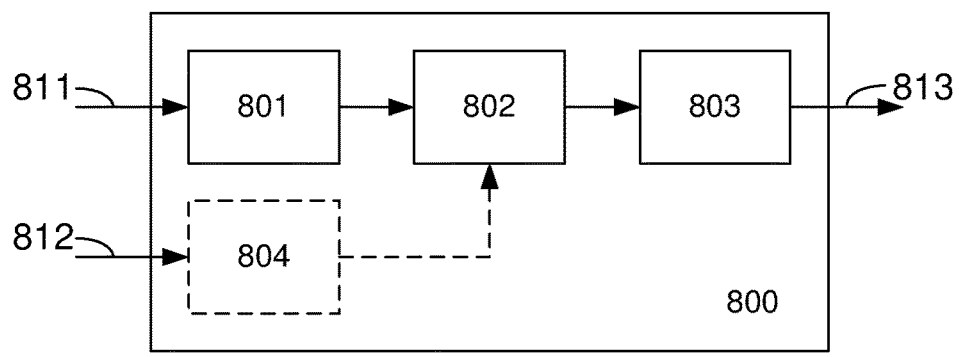
FIG. 8: illustrates a network node for throttling a media stream in accordance with an embodiment of the second aspect of the invention.

In the following, an embodiment of the network node for throttling a media stream is described with reference to FIG. 8.

The media stream 811 comprises a sequence of media segments for transmission 813 to a client via a RAN. Network node 800 comprises means 801 for acquiring a media segment of the sequence of media segments, means 802 for determining the duration of the media segment, and means 803 for transmitting the media segment to the client.

Means 801 for acquiring a media segment may be arranged for retrieving the media segment from a local buffer or storage. Alternatively, means 801 for acquiring a media segment may be arranged for receiving the media segment over a communications network. In the first case, network node 800 may be the origin of the media stream, e.g., a media server or any other server providing the media stream. In the latter case, network node 800 may be a proxy or any network node suitable for delivering the media stream from a media server to a client via a RAN.

Means 802 for determining the duration of the media segment may be arranged for determining the duration of the media segment using DPI, if details about the file format used for encoding the media content are known. As an alternative, means 802 for determining the duration of the media segment may utilize a transparent TCP proxy. Further, means 802 for determining the duration of the media segment may be arranged for determining a periodicity with which media segments are acquired by means 801, or by inspecting a manifest file carried in the media stream 811. Alternatively, network node 800 may comprise means 804 for acquiring information 812 pertaining to the duration of the media segment from another network node, such as a media server. Such information 812 may be received out-of-band, i.e., separate from the media stream 811. One may also envisage an embodiment of network node 800 being arranged for determining the duration of the media segment by determining a periodicity with which media segments are requested by the client. For this purpose, network node 800 may comprise means (not illustrated in FIG. 8) for analyzing requests, such as HTTP GET messages described with reference to FIG. 2, transmitted from the client to the media server.

Means 803 for transmitting the media segment to the client is arranged for transmitting a first part of the media segment to the client, delaying transmission of the remaining part, and transmitting the remaining part to the client. At least one of the parts of the media segment is transmitted during a time interval which is shorter than a corresponding duration of that part, and transmission of the remaining part is delayed, such that a time interval between starting transmitting the first part and transmission of the remaining part being completed is shorter than the duration of the media segment.

Means 803 for transmitting the media segment to the client may further be arranged for transmitting at least one of the parts of the media segment with a relatively high bitrate such that a link bitrate required by the RAN for supporting that bitrate corresponds to a high-bitrate channel, such as an HSDPA channel. Even further, means 803 may be arranged for transmitting the remaining part using a relatively low bitrate such that a link bitrate required by the RAN for supporting the second bitrate corresponds to a low-bitrate channel, such as a FACH.

Means 803 for transmitting the media segment to the client may further be arranged for transmitting at least one intermediate part of the media segment to the client. Such an intermediate part may be transmitted between transmitting the first part and transmitting the remaining part. Preferably, means 803 is arranged for delaying transmission of the at least one intermediate part, similar to delaying transmission of the remaining part.

Network node 800 is arranged for throttling a media stream sequentially, i.e., on a segment-by-segment basis.

The person skilled in the art realizes that the invention by no means is limited to the embodiments described above. On the contrary, many modifications and variations are possible within the scope of the appended claims.

The invention claimed is:

1. A method of streaming video content to a client via a Radio Access Network (RAN), wherein the video content is divided into a plurality of media segments comprising a first media segment and a second media segment, the method comprising:
acquiring the first media segment of said video content, the first media segment having a certain duration;

after acquiring the first media segment of said video content, dividing the first media segment of said video content into a plurality of sub-segments, the plurality of sub-segments comprising a first sub-segment and a second sub-segment;

transmitting the first sub-segment to the client during a first time interval having a length of t1; and transmitting the second sub-segment to the client during a second time interval having a length of t2, wherein there is a third time interval between the end of the first time interval and the beginning of second time interval, the third time interval having a length of t3, and during the entire third time interval the transmission of the first media segment is stalled such that no part of the first media segment is transmitted during the third time interval and such that the entire first media segment is transmitted to the client during a fourth time interval having a length t4 that is: i) greater than or equal to t1+t2+t3 and ii) not greater than the duration of the first media segment.

2. The method according to claim 1, wherein said certain duration of the first media segment is less than or equal to ten seconds and greater than or equal to two seconds.

3. The method according to claim 1, wherein the first sub-segment and the second sub-segment make up the entire first media segment.

4. The method according to claim 1, wherein the first media segment is acquired by receiving the media segment from a media server.

5. The method according to claim 1, wherein the video content is transmitted to the client using Adaptive HTTP Streaming (AHS).

6. The method according to claim 1, wherein at least one of the sub-segments of the first media segment is transmitted with a first bitrate such that a link bitrate required by the RAN for supporting the first bitrate corresponds to a high-bitrate channel.

7. The method according to claim 6, wherein at least one of the sub-segments is transmitted with a second bitrate such that a link bitrate required by the RAN for supporting the second bitrate corresponds to a low-bitrate channel.

8. The method according to claim 1, wherein the second sub-segment is substantially smaller than the first sub-segment.

9. The method according to claim 1, further comprising determining the duration of the first media segment, wherein the duration of the first media segment is determined using Deep Packet Inspection (DPI).

10. The method according to claim 1, further comprising determining the duration of the first media segment, wherein the duration of the media segment is determined using a transparent Transmission Control Protocol (TCP) proxy.

11. The method according to claim 1, further comprising determining the duration of the first media segment, wherein the duration of the first media segment is determined by determining a periodicity with which media segments of said video content are requested by the client.

12. The method according to claim 1, further comprising determining the duration of the first media segment, wherein the duration of the first media segment is determined by inspecting a manifest file.

13. The method according to claim 1, further comprising determining the duration of the first media segment, wherein the duration of the first media segment is determined by determining a periodicity with which media segments of the video content are acquired.

14. The method according to claim 4, wherein information pertaining to the duration of the first media segment is acquired from the media server.

15. A network node for use in streaming video content to a client via a Radio Access Network (RAN), wherein the video content is divided into a plurality of media segments comprising a first media segment and a second media segment, the network node comprising:

a memory, a transmitter, and a processor, the processor being configured to:

dividing the first media segment of the video content into a plurality of sub-segments, the plurality of sub-segments comprising a first sub-segment and a second sub-segment, said first media segment having a certain duration;

employ the transmitter to transmit the first sub-segment to the client during a first time interval having a length of t1, and employ the transmitter to transmit the second sub-segment to the client during a second time interval having a length of t2, wherein there is a third time interval between the end of the first time interval and the beginning of second time interval, the third time interval having a length of t3, the processor is further configured such that, during the entire third time interval, the processor stalls the transmission of the first media segment such that no part of the first media segment is transmitted during the third time interval, and the processor is further configured such that the entire first media segment is transmitted to the client during a fourth time interval having a length t4 that is: i) greater than or equal to t1+t2+t3 and ii) shorter than the duration of the first media segment.

16. The network node according to claim 15, wherein the network node is further configured to transmit at least one intermediate part of the first media segment to the client.

17. The network node according to claim 15, wherein the first sub-segment and the second sub-segment make up the entire first media segment.

18. The network node according to claim 15, wherein the network node includes a receiver for receiving the first media segment from a media server.

19. The network node according to claim 15, wherein the network node is configured to transmit the plurality of media segments to the client using Adaptive HTTP Streaming (AHS).

20. The network node according to claim 15, wherein the network node is further configured to transmit at least one of the sub-segments of the first media segment with a first bitrate such that a link bitrate required by the RAN for supporting the first bitrate corresponds to a high-bitrate channel.

21. The network node according to claim 20, wherein the network node is further configured to transmit at least one of the sub-segments with a second bitrate such that a link bitrate required by the RAN for supporting the second bitrate corresponds to a low-bitrate channel.

22. The network node according to claim 15, wherein the second sub-segment is substantially smaller than the first sub-segment.

23. The network node according to claim 15, wherein the network node is configured to determine the duration of the first media segment using Deep Packet Inspection (DPI).

24. The network node according to claim 15, wherein the network node is configured to determine the duration of the first media segment using a transparent Transmission Control Protocol (TCP) proxy.

25. The network node according to claim 15, wherein the network node is configured to determine the duration of the first media segment by determining a periodicity with which media segments are requested by the client.

26. The network node according to claim 15, wherein the network node is configured to determine the duration of the first media segment by inspecting a manifest file.

27. The network node according to claim 15, wherein the network node is configured to determine the duration of the first media segment by determining a periodicity with which media segments are acquired.

28. The network node according to claim 18, further comprising a receiver for receiving information pertaining to the duration of the first media segment from the media server.

29. The method of claim 1, wherein an available link rate, associated with the media stream, is measured and a representation that supports the available link rate is selected.

30. The method of claim 1, wherein the size of the second sub-segment of the first media segment results in transmitting the second sub-segment over a less resource consuming radio channel than a channel associated with the first sub-segment.

31. The method of claim 1, wherein:
dividing the acquired first media segment into a plurality of sub-segments consists of dividing the acquired first media segment into only two sub-segments, the first sub-segment and the second sub-segment,
r1=r2, r1 being the bit rate at which the first sub-segment is transmitted and r2 being the bit rate at which the second sub-segment is transmitted.

32. The method of claim 31, wherein
the method further comprises a receiving a request from the client for the first media segment, and
the steps of: acquiring the first media segment, transmitting the first sub-segment, and transmitting the second sub-segment are all performed in response to receiving the request for the first media segment.

33. The method of claim 31, wherein
a media server transmits the first media segment in response to receiving a request for the first media segment from the client,
the step of acquiring the first media segment comprises receiving the first media segment transmitted by the media server in response to the request from the client, and
the steps of: transmitting the first sub-segment and transmitting the second sub-segment are all performed in response to receiving the first media segment transmitted by the media server in response to the request from the client.

34. The method of claim 1, wherein the RAN transmits, during the third time interval, data other than a sub-segment of the first media segment.

35. The method of claim 34, wherein the RAN transmits said other data to a client different than the client to which the first media segment is being transmitted.

36. The method of claim 1, wherein the plurality of sub-segments further comprises a third sub-segment, which is transmitted either a) after the first sub-segment is transmitted and before the second sub-segment is transmitted or b) before the first sub-segment is transmitted.

37. The method of claim 1, wherein the step of acquiring the first media segment comprises receiving an HTTP response message transmitted by a media server in response to the media server receiving an HTTP request transmitted by said client.

38. The method of claim 37, wherein
the step of receiving the HTTP response comprises receiving a first set of one or more packets, each packet included in said first set of packets comprising at a least a portion of said HTTP response,
the HTTP response comprises an HTTP header and said first media segment,
transmitting the first sub-segment of the first media segment comprises transmitting towards the RAN a second set of one or more packets, wherein at least one of the packets included in the second set of packets includes a least a portion of the HTTP header, and
transmitting the second sub-segment of the first media segment comprises transmitting towards the RAN a third set of one or more packets, wherein no portion of the HTTP header is included in any packet included in said third set of packets.

* * * * *

UNITED STATES PATENT AND TRADEMARK OFFICE
CERTIFICATE OF CORRECTION

PATENT NO. : 9,967,303 B2
APPLICATION NO. : 13/812558
DATED : May 8, 2018
INVENTOR(S) : Eriksson et al.

Page 1 of 1

It is certified that error appears in the above-identified patent and that said Letters Patent is hereby corrected as shown below:

In the Claims

In Column 18, Line 31, in Claim 38, delete "at a least" and insert -- at least --, therefor.

In Column 18, Line 39, in Claim 38, delete "a least" and insert -- at least --, therefor.

Signed and Sealed this
Fourth Day of December, 2018

Andrei Iancu
*Director of the United States Patent and Trademark Office*